Figure 1:
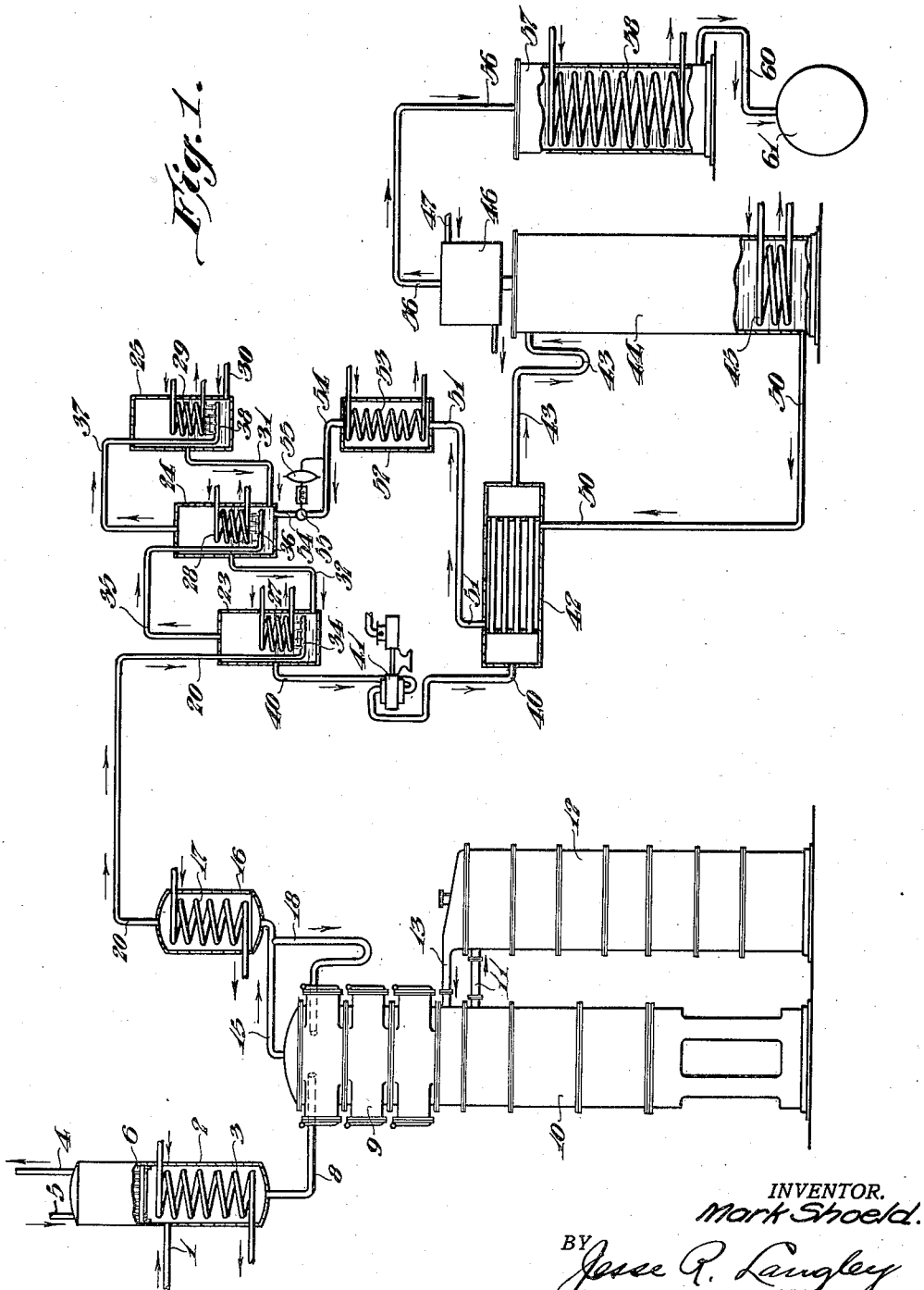

Aug. 23, 1932.  M. SHOELD  1,872,829
METHOD AND APPARATUS FOR THE MANUFACTURE OF CONCENTRATED AMMONIA LIQUOR
Filed May 17, 1929  2 Sheets-Sheet 2

INVENTOR.
Mark Shoeld.
BY
Jesse R. Langley
ATTORNEY.

Patented Aug. 23, 1932

1,872,829

UNITED STATES PATENT OFFICE

MARK SHOELD, OF MOUNT LEBANON TOWNSHIP, ALLEGHENY COUNTY, PENNSYLVANIA, ASSIGNOR TO THE KOPPERS COMPANY OF DELAWARE, A CORPORATION OF DELAWARE

METHOD AND APPARATUS FOR THE MANUFACTURE OF CONCENTRATED AMMONIA LIQUOR

Application filed May 17, 1929. Serial No. 363,975.

This invention relates to the manufacture of ammonia liquor having a strength greater than the usual twenty-five percent. More specifically, it consists of a process for the further concentration of the twenty-five percent ammonia liquor that is produced by the usual ammonia still in order to obtain an ammonia content in the liquor of approximately fifty percent.

Without the use of the present invention, ammonia liquor having a strength of fifty percent or more can be obtained through the production and liquefaction of anhydrous ammonia and the dilution of the same to the required strength. Such well known methods involve the installation and operating expenses incident to the use of high pressure pumping machinery.

Other known methods that might avoid the production of anhydrous ammonia would still require the compression of ammonia in the vapor phase along with the attendant water vapor.

An object of the invention is to conduct the additional concentration of the ammonia liquor at only an insignificant extra expense due to the fact that the process does not require the compression of any ammonia in gaseous or vapor form by means of a pump. Since ammonia liquor having a strength of fifty percent cannot be maintained at atmospheric pressure and since the present invention does not contemplate the use of any unusually low temperatures, it is obvious to those skilled in the art that pumping or forcing of the ammonia against a head of pressure at some stage of the process is required. Such pumping does occur during a stage of the process in which the ammonia with its attendant moisture is in the liquid phase as will be made apparent by the accompanying drawings and the detailed part of the description relating thereto. In these drawings, Fig. 1 is a view, partially in elevation and partially in section, of an ammonia still and associated apparatus arranged in accordance with my invention; and Fig. 2 is a similar view of a modified form of apparatus also arranged in accordance with my invention.

Similar reference numerals indicate similar parts in each of the views of the drawings.

Figure 2:
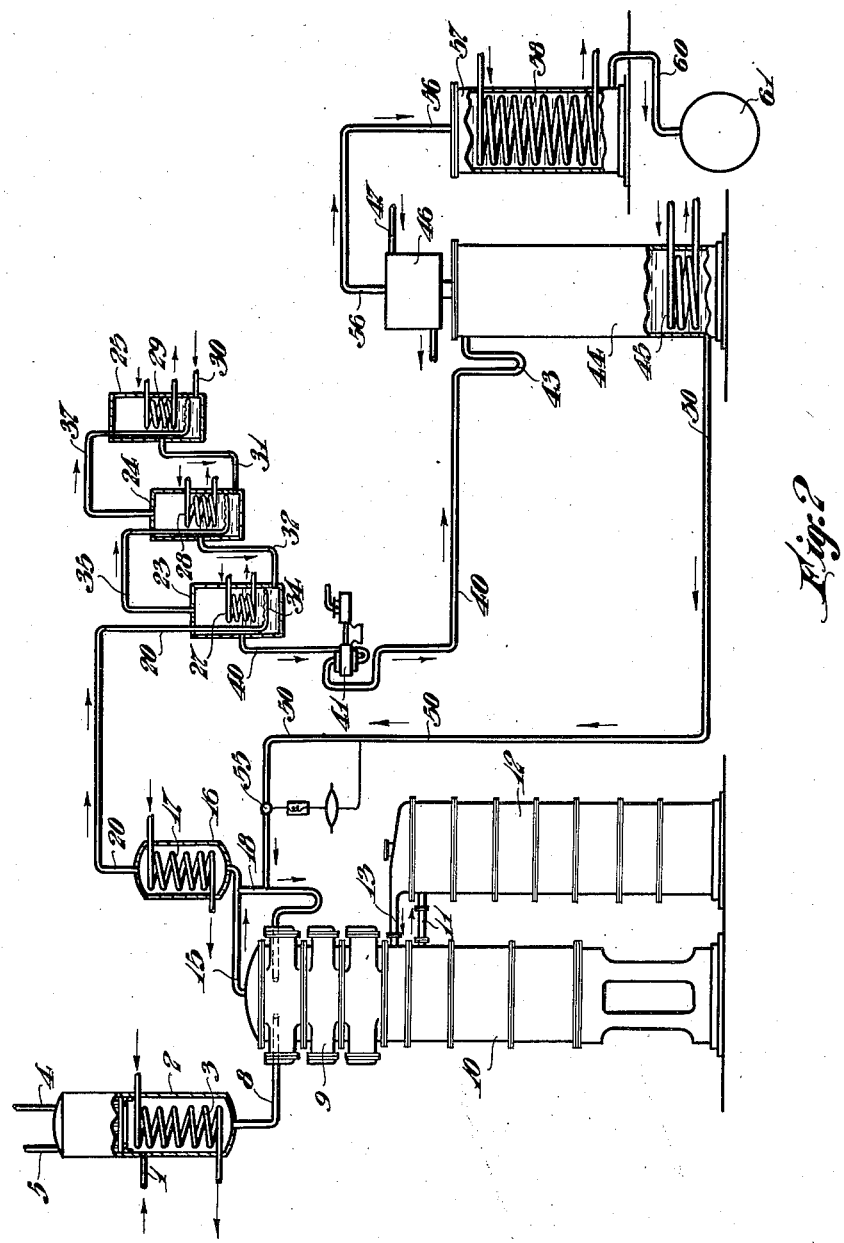

In the drawings, and more particularly Fig. 1 thereof, a crude liquor pipe 1 conducts, for example, water of condensation from a hydraulic main bearing free ammonia and fixed ammonia to the extent of 1% to 2%.

The crude liquor inlet leads to a preheater 2 provided with a heating coil 3 that not only heats the crude liquor preparatory to distillation, but also drives off carbon dioxide and hydrogen sulphide through a vent 4.

A small amount of ammonia would also be driven off through the vent pipe were it not for the introduction of a small amount of wash water through a pipe 5 which trickles through the baffles 6 so as to wash the carbon dioxide and hydrogen sulphide free from ammonia.

The crude liquor heated, freed from carbon dioxide and hydrogen sulphide and containing the small extra amount of water that was introduced through the pipe 5 passes through a pipe 8 to the top of a free ammonia still 9.

After the free ammonia is distilled off, the crude liquor passes through an appropriate lime pocket within the chamber 10 and passes through pipe 11 into the fixed ammonia still 12.

The fixed ammonia still drives off the ammonia which has been liberated by the lime treatment through outlet 13 and the ammonia passes upwardly through the free ammonia still 9.

The ammonia mixed with water vapor passes through pipe 15 to a dephlegmator 16 that is provided with a cooling coil 17. The condensed vapors are refluxed through pipe 18 back to the upper part of the free ammonia still 9.

Owing to the passage of vapor upwardly through the pipe 15 and the continuous recirculation or refluxing of condensed water, rather weak in ammonia, back to the still through a pipe 18, the gas issuing from the top of the dephlegmator into pipe 20 is very strong, containing possibly 75% of ammonia.

It should be noted, however, that the 75% ammonia in pipe 20 is not in liquid form, but in the form of vapor.

The pipe 20 conducts the strong ammonia gas to the first unit 23 of an absorber comprising three units 23, 24 and 25. The units are respectively equipped with cooling coils 27, 28 and 29.

Pure water is admitted through pipe 30 to unit 25 of the series of units comprising the absorber and liquor overflows from unit 25 through pipe 31 into unit 24 and likewise overflows from unit 24 through pipe 32 into unit 23.

The strong gas inlet pipe 20 ends at the bottom of absorber unit 23 in a perforated ring 34. Vapor issuing from the top of unit 23 passes through pipe 35 to the bottom of unit 24 and bubbles out of perforated ring 36. In like manner, vapor is led through pipe 37 from the top of absorber unit 24 to perforated ring 38 in the bottom of unit 25.

The overflow from absorber unit 23 is a pipe 40 conducting ammonia liquor of possibly a strength of 25% and it is provided with a pump 41 for forcing the liquor against pressure. Pipe 40 leads to a heat exchanger 42 and the liquor leaves the heat exchanger through pipe 43 which leads to the upper part of a pressure still 44 provided with a heating coil 45 and a dephlegmator 46 which is provided with a cooling coil 47.

Weak ammonia liquor from the bottom of the pressure still is returned through pipe 50 to heat exchanger 42 and after giving up part of its heat continues through pipe 51 to a cooler 52 provided with a cooling coil 53 where additional heat is extracted from the weak ammonia liquor.

From the cooler 52, the weak liquor continues through pipe 54 which is provided with a pressure reducing valve 55. The weak liquor continues through pipe 54 to the absorber composed of the three units 23, 24 and 25 and is preferably connected to the middle unit 24. This weak liquor may contain 5 to 8% of ammonia.

The vapor from the pressure still 44 and dephlegmator 46 passes through pipe 56 to a pressure condenser 57 provided with a cooling coil 58.

The liquor condensed by the cooling coil 58 passes from the lower part of the pressure condenser through pipe 60 to a suitable shipping container or tank car 61 capable of holding the ammonia liquor under considerable pressure. The pipe 60 is not provided with any pressure reducing valve because the container 61 must necessarily be under pressure since the ammonia in 50% ammonia liquor would boil away if subjected only to atmospheric pressure.

In operation, the amount of water introduced through pipe 30 into the absorbing system composed of units 23, 24 and 25 equals in amount the water discharged in the form of 50% liquor from the pressure condenser through pipe 60 into the pressure container 61 less the amount of water passing through the line 20 in vapor form from the still 9 and dephlegmator 16.

The free ammonia still and associated apparatus through which the ammonia passes before reaching the pipe 20 as strong gas is conventional. The invention is embodied in the apparatus comprising the units making up the absorber system, the pressure still and the pressure condenser along with their accessories.

The presence of the dephlegmator 46 and the additional cooling means 52 are optional. The heat exchanger 42 is also optional although its presence is advisable. The weak ammonia return liquor line conducting 5% to 8% ammonia from the pressure still to the units comprising the absorber need not be connected to the exact middle of the absorbing system; for example, it need not be connected to the middle unit 24 although this location of the connection is preferable.

In the modification of the embodiment illustrated in Fig. 2, the weak ammonia liquor in pipe 50 is returned to the regular still by joining pipe 50 to pipe 18. This arrangement makes it unnecessary to cool the weak ammonia liquor and the heat exchanger 42 and cooler 52 are omitted. The pressure-reducing valve 55 is located on line 50. In this modification, the amount of water introduced through pipe 30 would necessarily be greater than the amount leaving the system through the pipe 60.

Although a pump is necessarily present in the system because ammonia is taken from a conventional still operating under atmospheric pressure and is further concentrated in a pressure still, it should be noted that this pump is not located on a vapor line but is located on a line conducting liquor, pipe 40 in the drawings.

This invention not only avoids the expense of pumping the ammonia in gaseous or vapor form but avoids the use of any moving parts with the exception of one pressure regulating valve and one pump that is only employed for pumping ammonia liquor against the very moderate head of pressure that is required to keep fifty percent ammonia from boiling away at ordinary temperatures.

Another advantage of the invention resides in the fact that the process for carrying it into effect is a continuous one permitting the apparatus for the same to keep step with the conventional twenty five percent ammonia still and therefore permitting it to be attached directly thereto.

An advantage of the invention is the saving of freight charges, especially on long hauls, since two thirds of the water present in the regular twenty five percent aqua ammonia is removed. This results in a reduction of shipping weight that amounts to one-half of that of the regular twenty five percent ammonia liquor when calculated to an equal ammonia basis.

Numerous other and modifications will be apparent to those skilled in the art without foregoing the advantages inherent in the invention and without exceeding the scope of the appended claims.

I claim as my invention:

1. Apparatus for manufacturing ammonia liquor of such strength that pressure above atmospheric is required to maintain its concentration at ordinary temperatures which comprises, in combination, a vapor line leading from a source of ammoniacal vapors at substantially atmospheric temperature, an absorber in said vapor line, means for supplying water to said absorber to absorb vapors therein, a still adapted to operate at pressure above atmospheric, means for forcing ammoniacal liquor from said absorber into said still, and means for returning residual liquid from the still to said absorber.

2. In the process of manufacturing ammonia liquor of such strength that pressure above atmospheric is required to maintain its concentration at ordinary temperatures from ammoniacal vapors at substantially atmospheric pressure, the steps which comprise treating said vapors in an absorption stage with water to absorb the same, forcing ammoniacal liquor thereby produced into a pressure still and there distilling it under pressure above atmospheric, and returning residual liquor from said distillation to said absorption stage for absorption of ammoniacal vapor.

3. Apparatus for manufacturing ammonia liquor of such strength that pressure above atmospheric is required to maintain its concentration at ordinary temperatures which comprises, in combination, a vapor line leading from a source of ammoniacal vapors at substantially atmospheric temperature, an absorber in said vapor line, means for supplying water to said absorber to absorb vapors therein, a still adapted to operate at pressure above atmospheric, means for forcing ammoniacal liquor from said absorber into said still, means for returning residual liquor from the still to said absorber and a pressure reducing valve located in said means.

4. In the process of manufacturing ammonia liquor of such strength that pressure above atmospheric is required to maintain its concentration at ordinary temperatures from ammoniacal vapors at substantially atmospheric pressure, the steps which comprise treating said vapors in an absorption stage with water to absorb the same, forcing ammoniacal liquor thereby produced into a pressure still and there distilling it under pressure above atmospheric, reducing the pressure of residual liquor from the distillation and then returning it to said absorption stage for absorption of ammoniacal vapor.

5. Apparatus for manufacturing ammonia liquor of such strength that pressure above atmospheric is required to maintain its concentration at ordinary temperatures which comprises, in combination, a vapor line leading from a source of ammoniacal vapors at substantially atmospheric temperature, an absorber in said vapor line, means for supplying water to said absorber to absorb vapors therein, a still adapted to operate at pressure above atmospheric, means for forcing ammoniacal liquor from said absorber into said still, means for returning residual liquid from the still to said absorber and means for effecting an exchange of heat between said residual liquor and the ammoniacal liquor entering said still from the absorber.

6. In the process of manufacturing ammonia liquor of such strength that pressure above atmospheric is required to maintain its concentration at ordinary temperatures from ammoniacal vapors at substantially atmospheric pressure, the steps which comprise treating said vapors in an absorption stage with water to absorb the same, forcing ammoniacal liquor thereby produced into a pressure still and there distilling it under pressure above atmospheric, effecting an exchange of heat between residual liquor from said distillation and ammoniacal liquor entering the still from the absorption stage.

7. The process of manufacturing ammonia liquor of such strength that pressure above atmospheric is required to maintain its concentration at ordinary temperatures from weak ammoniacal liquor, which comprises, subjecting the weak liquor to distillation at substantially atmospheric pressure, absorbing ammoniacal vapors thereby produced in water, forcing ammoniacal liquor thereby produced into a still and there distilling it under pressure above atmospheric, collecting the distillate therefrom under substantially the same pressure, and returning aqueous residual liquor from said still to said absorption stage for further absorption of ammoniacal vapors.

8. Apparatus for manufacturing ammonia liquor of such strength that pressure above atmospheric is required to maintain its concentration at ordinary temperatures from weak ammoniacal liquor which comprises, in combination, a still for said weak liquor adapted to operate at substantially atmospheric pressure, a vapor line leading from said still an absorber in said vapor line and adapted to operate at substantially atmospheric pressure, means for supplying water to said absorber, a still adapted to operate at pressure above atmospheric, a condenser associated therewith adapted to operate at substantially the same pressure, means for forcing ammoniacal liquor from said absorber into said pressure still and means for returning residual liquor from said pressure still to said absorber.

9. The process of manufacturing ammonia liquor of such strength that pressure above atmospheric is required to maintain its concentration at ordinary temperatures from weak ammoniacal liquor which comprises, subjecting the weak liquor to distillation at substantially atmospheric pressure, absorbing ammoniacal vapors thereby produced in water, forcing ammoniacal liquor thereby produced into a still and there distilling it under pressure above atmospheric, collecting the distillate therefrom under substantially the same pressure, effecting an exchange of heat between residual liquor leaving said pressure still and ammoniacal liquor entering it from said absorption stage, and then returning said residual liquor to said absorption stage for further absorption of ammoniacal vapors.

10. Appartus for manufacturing ammonia liquor of such strength that pressure above atmospheric is required to maintain its concentration at ordinary temperatures from weak ammoniacal liquor which comprises, in combination, a still for said weak liquor adapted to operate at substantially atmospheric pressure, a vapor line leading from said still, an absorber in said vapor line and adapted to operate at substantially atmospheric pressure, means for supplying water to said absorber, a still adapted to operate at pressure above atmospheric, a condenser associated therewith adapted to operate at substantially the same pressure, means for forcing ammoniacal liquor from said absorber into said pressure still, means for effecting an exchange of heat between residual liquod leaving said pressure still and ammoniacal liquor entering it from said absorber, and means for returning said residual liquor to said absorber for further absorption of ammoniacal vapors.

11. The process of manufacturing ammonia liquor of such strength that pressure above atmospheric is required to maintain its concentration at ordinary temperatures from weak ammoniacal liquor which comprises, subjecting the weak liquor to distillation at substantially atmospheric pressure, absorbing ammoniacal vapors thereby produced in water, forcing ammoniacal liquor thereby produced into a still and there distilling it under pressure above atmospheric, collecting the distillate therefrom under substantially the same pressure, reducing the pressure of residual liquor leaving said pressure still and then returning it to said absorption stage for further absorption of ammoniacal vapors.

12. Apparatus for manufacturing ammonia liquor of such strength that pressure above atmospheric is required to maintain its concentration at ordinary temperatures from weak ammoniacal liquor which comprises, in combination, a still for said weak liquor adapted to operate at substantially atmospheric pressure, a vapor line leading from said still, an absorber in said vapor line and adapted to operate at substantially atmospheric pressure, means for supplying water to said absorber, a still adapted to operate at pressure above atmospheric, a condenser associated therewith adapted to operate at substantially the same pressure, means for forcing ammoniacal liquor from said absorber into said pressure still, and means for reducing the pressure of residual liquor leaving said pressure still and then returning it to said absorber for further absorption of ammoniacal vapors.

13. The process of manufacturing ammonia liquor of such strength that pressure above atmospheric is required to maintain its concentration at ordinary temperatures from weak ammonia liquor, which comprises, subjecting the weak liquor to distillation at substantially atmospheric pressure, absorbing ammoniacal vapors thereby produced in water, forcing ammoniacal liquor thereby produced into a still and there distilling it under pressure above atmospheric, collecting the distillate therefrom under substantially the same pressure, and returning aqueous residual liquor from said still to said absorption stage for further absorption of ammoniacal vapors, the amount of water added to said absorption stage being equal to the difference between the water contents of the ammoniacal distillates evolved in the distillations at substantially atmospheric, and at above atmospheric pressure, respectively.

14. The process of manufacturing ammonia liquor of such strength that pressure above atmospheric is required to maintain its concentration at ordinary temperatures from weak ammoniacal liquor, which comprises, subjecting the weak liquor to distillation at substantially atmospheric pressure, absorbing ammoniacal vapors thereby produced in water, forcing ammoniacal liquor thereby produced into a still and there distilling it under pressure above atmospheric, collecting the distillate therefrom under substantially the same pressure, and returning aqueous residual liquor from said still to said absorption stage for further absorption of ammoniacal vapors, the amount of water added to said absorption stage being equal to the difference between the water contents of the ammoniacal distillates evolved in the distillations at substantially atmospheric, and at above atmospheric pressure, respectively, and the amount and temperature of residual liquor returned to the absorption stage being such as to permit the absorption at substantially atmospheric pressure in the combined residual liquor and added water, of the entire ammonia content of the distillate treated in the absorption stage.

15. The process of manufacturing concentrated ammonia liquor from ammonical vapors which comprises substantially continuously recirculating an aqueous liquid through a cycle comprising an absorption stage in the path of said vapors and a pressure still, and condensing the distillate from the pressure still at a pressure corresponding to that in the still.

16. Apparatus for manufacturing concentrated ammonia liquor from ammoniacal vapors which comprises, in combination, an absorber means for supplying ammoniacal vapors to said absorber, a pressure still having a condenser associated therewith and adapted to operate at a pressure corresponding to that in the still, and means for substantially continuously recirculating aqueous liquid through a cycle comprising said absorber and said pressure still.

17. The process of manufacturing ammonia liquor of such strength that pressure above atmospheric is required to maintain its concentration at ordinary temperatures from weak ammoniacal liquor which comprises subjecting the weak liquor to distillation, absorbing ammoniacal vapors therefrom, distilling ammoniacal liquor thereby produced under a higher pressure and condensing the distillate under said higher pressure, and recirculating aqueous liquor through a cycle comprising said absorption stage and said higher pressure distillation stage.

18. Apparatus for manufacturing ammonia liquor of such strength that pressure above atmospheric is required to maintain its concentration at ordinary temperatures from weak ammoniacal liquor which comprises, in combination, a preliminary still for said weak ammoniacal liquor, a vapor line leading from said still, an absorber in said vapor line and adapted to operate at a pressure corresponding to that in said preliminary still, a finishing still adapted to operate at a higher pressure, means for recirculating aqueous liquid through a cycle comprising said absorber and said finishing still, and a condenser associated with said finishing still and adapted to operate under a pressure corresponding to that in said finishing still.

In testimony whereof, I have hereunto subscribed my name this 14th day of May, 1929.

MARK SHOELD.